United States Patent
Lu et al.

(10) Patent No.: US 8,184,872 B2
(45) Date of Patent: May 22, 2012

(54) ONE TIME PASSWORD GENERATING METHOD AND APPARATUS

(75) Inventors: Zhou Lu, Beijing (CN); Huazhang Yu, Beijing (CN)

(73) Assignee: Feitian Technologies Co., Ltd., Beijing (CN)

(*) Notice: Subject to any disclaimer, the term of this patent is extended or adjusted under 35 U.S.C. 154(b) by 803 days.

(21) Appl. No.: 12/326,942

(22) Filed: Dec. 3, 2008

(65) Prior Publication Data

US 2009/0161924 A1    Jun. 25, 2009

(30) Foreign Application Priority Data

Dec. 24, 2007   (CN) .......................... 2007 1 0304030

(51) Int. Cl.
*G06K 9/00* (2006.01)
*G05B 19/00* (2006.01)
*G06F 21/00* (2006.01)

(52) U.S. Cl. ....... 382/124; 382/115; 382/209; 340/5.53; 340/5.54; 713/184; 713/186

(58) Field of Classification Search .................. 382/124, 382/115, 125, 118, 190, 116, 218, 305, 100, 382/181, 209, 217, 117; 713/186, 187, 185, 713/193, 182, 189, 184; 726/7, 18, 5, 27, 726/2, 3, 16, 17; 340/5.52, 5.82, 5.8, 5.53, 340/5.6, 5.81, 5.83, 5.1, 5.2, 5.51, 5.54; 235/382, 235/380, 375; 902/2

See application file for complete search history.

(56) References Cited

U.S. PATENT DOCUMENTS

| | | | |
|---|---|---|---|
| 6,272,562 B1* | 8/2001 | Scott et al. .................. 710/16 |
| 6,636,973 B1* | 10/2003 | Novoa et al. ................ 726/20 |
| 6,757,411 B2* | 6/2004 | Chau ............................ 382/125 |
| 6,871,230 B1* | 3/2005 | Fukunaga et al. ........... 709/225 |
| 7,181,627 B2 | 2/2007 | Yu |
| 7,236,617 B1* | 6/2007 | Yau et al. ..................... 382/125 |
| 7,272,380 B2* | 9/2007 | Lee et al. ..................... 455/410 |
| 7,369,688 B2* | 5/2008 | Ser et al. ...................... 382/124 |
| 7,552,467 B2* | 6/2009 | Lindsay .......................... 726/5 |
| 7,613,929 B2* | 11/2009 | Cohen et al. ................. 713/186 |
| 2003/0035569 A1* | 2/2003 | Chau ............................ 382/124 |
| 2004/0199775 A1* | 10/2004 | Ser et al. ...................... 713/186 |
| 2007/0118758 A1* | 5/2007 | Takahashi et al. ........... 713/186 |
| 2008/0049987 A1* | 2/2008 | Champagne et al. ........ 382/124 |
| 2008/0059226 A1* | 3/2008 | Melker et al. .................... 705/2 |
| 2008/0280644 A1* | 11/2008 | Hugot ........................ 455/556.2 |
| 2008/0320577 A1* | 12/2008 | Larduinat ........................ 726/9 |

* cited by examiner

*Primary Examiner* — Sheela Chawan
(74) *Attorney, Agent, or Firm* — Hammer & Associates, P.C.

(57) ABSTRACT

The invention relates to a one-time password generating method and an apparatus. The method includes steps of collecting fingerprint images, extracting fingerprint feature data from those fingerprint images, and comparing the fingerprint feature data with one or more pre-stored fingerprint feature templates for authentication. After the authentication is passed, a one-time password is generated by the corresponding fingerprint feature template or a user's secret corresponding to the template. The invention also discloses a one-time password apparatus, including a fingerprint collecting unit, a fingerprint feature extracting unit, a storage unit, a comparison unit, a one-time password generating unit, a control unit, and an output unit. By adding fingerprint authentication function to a one-time password generating apparatus, the invention avoids disadvantages such as no user authentication in the present apparatus, only for a single user, and imitation of the apparatus by others when it is lost or theft, as a result, increases security of the apparatus.

20 Claims, 2 Drawing Sheets

ONE TIME PASSWORD GENERATING METHOD AND APPARATUS

FIELD OF THE INVENTION

The invention relates to a user authentication system, in particularly to a one time password generating method and an apparatus.

BACKGROUND OF THE INVENTION

At present, more and more online crimes emerge, which is mainly resulted from disadvantages inhered in authentication method. The commonly-used method is static password authentication. The so-called static password authentication method means that data used in the authentication process is static data, this means that, the password in each authentication is constant, therefore the static password is easy to be got through memory scanning or online listening. It is a potential threat to security.

For recent years, slow development in password technology and rapid development in decryption technology make it a threat to reliability of authenticating a user.

A dynamic password authentication technology is developed in order to eliminate the security problems derived from the static password. The dynamic password, also called the one time password, is a name relative to the traditional static one.

The dynamic password differs with the changeable dynamic factor used for generating the password. Double factors are applied in algorithm for generating the dynamic password. Among the two factors, one is for identifying a user, which is constant, such as the user's private password, while the other is a changeable factor, such as time, random data, and a counter value etc.

The dynamic password technology applies a special apparatus named one time password token with a built-in power, a password generating chip, and a screen. The password generating chip executes special password algorithm, and a password is generated based on the current time and frequency value and is displayed on a screen.

Due to advantages that the one time password token is hold by a user himself and therefore others cannot get the password therein along with that the password cannot be predicted, the technology meets the need for authenticating and authorizing a user during a process of distant logging-on online information service system.

However, the present one time password generating apparatus has disadvantages such as lack of a function of authenticating a user as a valid holder of the apparatus thereon, only for one user with the old apparatus, and imitation of the apparatus when it is lost or theft.

SUMMARY OF THE INVENTION

The invention overcomes the above-mentioned shortcomings, and provides a method for generating a one time password with high safety and convenience and an apparatus thereof.

The one time password generating method provided by the invention includes steps of collecting fingerprint images, extracting fingerprint feature data, comparing the fingerprint feature data with one pre-stored fingerprint feature template or more fingerprint feature templates separately, and generating a one time password after a match is found.

Before the step of collecting fingerprint images, the invention further includes a step of triggering a signal to collect fingerprint images.

The step of comparison is a step of comparing the fingerprint feature data extracted with at lest one of pre-stored fingerprint feature templates separately.

The one time password can be generated by the fingerprint feature template or the user's secret corresponding to the template.

The step of generating a one time password can be executed by computing the user's secret and a dynamic factor, or by computing the fingerprint feature template value and a dynamic factor with preset password generating algorithm.

The dynamic factor includes an event and/or a time factor.

The invention further includes a step of evening or merging fingerprint images collected from many times after those images are collected.

The invention further includes a step of choosing an optimal fingerprint image from those collected from many times after those fingerprint images are collected.

The pre-stored fingerprint feature template(s) can be one or more fingerprint feature templates corresponding to one user.

The pre-stored fingerprint feature templates can be a plurality of fingerprint feature templates corresponding to more users.

The invention also discloses a one time password generating apparatus, including:

a fingerprint image collecting unit for collecting fingerprint images under control of a control unit;

a fingerprint feature extracting unit for extracting fingerprint feature data from the fingerprint images collected by the fingerprint image collecting unit under control of the control unit;

a storage unit for storing one or more fingerprint feature templates under control of the control unit;

a comparison unit for comparing the fingerprint feature data extracted by the fingerprint feature extracting unit with those fingerprint feature templates in the storage unit and returning a comparison result to the control unit;

the control unit for starting a one time password generating unit according to the comparison result and sending the password to an output unit;

the one time password generating unit for generating a one time password with the pre-stored one time password generating algorithm and sending it to the control unit; and the output unit for outputting the one time password under control of the control unit.

The apparatus further includes a trigger unit for sending a signal to the control unit to trigger the fingerprint image collecting unit.

The output unit further includes a screen, a blue-tooth communication interface, or an infrared communication interface.

The apparatus further includes a battery unit for power supply.

The output unit can be a USB communication interface.

The USB communication interface can be used as a power supply for the apparatus.

The fingerprint image collecting unit can be an infrared sensor, a fingerprint scanner, a CCD, or a CMOS image sensor.

The storage unit can store one or more fingerprint feature templates corresponding to one valid user.

The storage unit can store a plurality of fingerprint feature templates corresponding to more valid users.

The apparatus further includes an input unit for inputting fingerprint feature templates.

The invention adds a function of fingerprint authentication to the one time password generating apparatus, as a result, avoids disadvantages such as lack of a function of authenticating a user as a valid holder of the apparatus thereon, only for one user holding the old apparatus, imitation of the apparatus when it is lost or theft, and therefore improves security of the apparatus greatly.

DETAILED DESCRIPTION OF THE PREFERRED EMBODIMENTS

Embodiment 1

Figure 1:
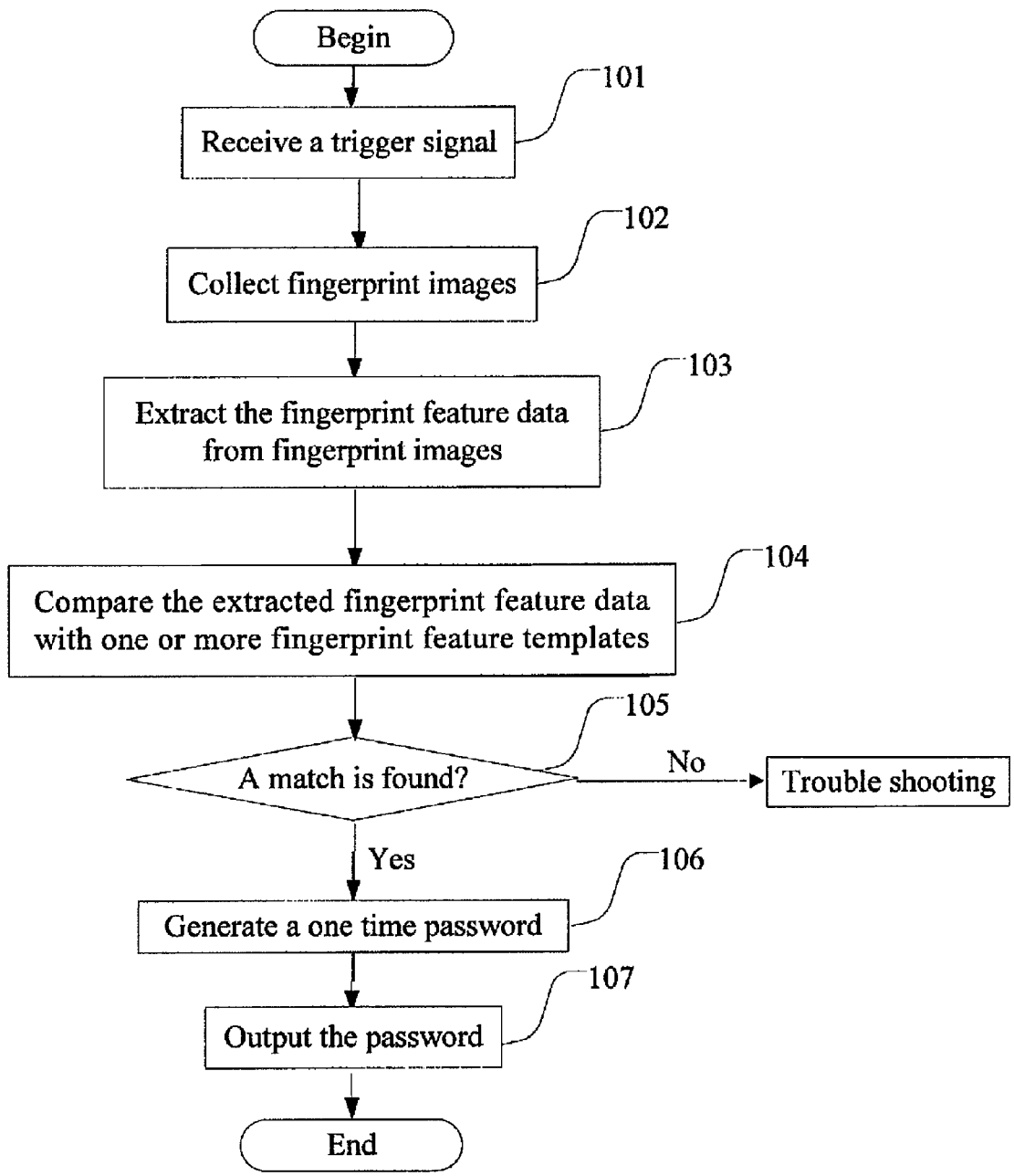
FIG. 1 is a flow chart of the method according to an embodiment 1 of this invention.

The embodiment 1 discloses a one time password generating method, as shown in FIG. 1, a flow chart thereof, including steps described below.

In step 101, a trigger signal from a button or a sensing apparatus is received to enable collecting fingerprint images.

In step 102, fingerprint images are collected through scanning, taking photo, or infrared sensing.

Preferably, those fingerprint images can be collected for many times, and a final optimal one can be gotten from those collected ones through selecting them, or evening or merging them.

In step 103, fingerprint feature data is extracted from the final optimal image.

In step 104, the fingerprint feature data is compared with that pre-stored one corresponding to one valid user.

The step of comparison is a step of comparing the fingerprint feature data collected in Step 103 with one fingerprint feature template when only one fingerprint feature template is pre-stored, or with more fingerprint feature templates separately when more fingerprint feature templates are pre-stored.

In this embodiment, one or more fingerprint feature templates corresponding to one valid user can be pre-stored, this means that, the template can be gotten from one finger of the valid user or more templates from more fingers of the same person. For example, these templates can be gotten from the middle finger of one user's left and right hand separately, or from more fingers of one user's left hand at the same time. Also, fingerprint feature templates from many valid users can be pre-stored, wherein only one fingerprint feature template can be stored by each valid user from his one finger or more by each valid user from different fingers of his two hands. Furthermore, a method of one user storing fingerprint feature templates is different from that of another, for example, party A can store only one template from his one finger, while party B can store more templates from his different fingers.

In step 105, determining if a match is found, if it is, go to step 106; otherwise a trouble-shooting will be executed. The trouble-shooting can be an end to all steps, or a prompt of a user to re-input fingerprints for authentication which means that it is to return to step 102 for a restart.

In step 106, after the match is found, a password is enabled to generate with one time password generating algorithm.

The one time password also can be generated by one user's pre-stored secret corresponding to the fingerprint feature template matched in the comparison process in step 105. The user's secret can be a user's ID number, or a random number, etc.

More methods of generating a one time password with the pre-stored password generating algorithm by computing the user's secret and time and/or event factor etc. are listed below.

The one time password can be gotten by a part or whole of one user's secret directly or indirectly in combination with a time and/or an event factor. For example, if one user's secret is 12345 and a time factor is 1011, the password can be gotten by computing whole of the user's secret and the time factor directly, herein computation includes addition, subtraction, multiplication, division, AND, OR, NOT, and XOR, etc. Take subtraction as an example, the password can be gotten by 12345 minus 1011 that is 11334. In the above-described operation, the time factor can be gotten by the current time or a conversion to it. The conversion to the time factor includes a time digit exchange, a time digit combination, a time digit sort, or an operation (addition, subtraction, multiplication, and division) to the time value by a fixed value. In all, those skilled in the art will get the time factor converted with all the above-mentioned methods or the other replacements, and therefore it is not necessary for more description. Otherwise, the password also can be gotten by part of one user's secret, such as by continue or discontinue part of the secret as pre-determined. For example, the password 123+1011=1134 can be gotten by adding the first three digits 123 of the user's secret of 12345 and the time factor 1011. Different from the above-mentioned algorithm, the password also can be gotten by computing a conversion result of the whole or part of the user's secret and time factor, herein the conversion method of the whole or part of the user's secret includes a digit exchange, a digit combination, and a digit sorting. Taking digit exchange method as an example, the password 54321 can be gotten firstly by reversing the user's secret order of 12345, and secondly by adding the result value and the time factor. The method of generating a one time password by a user's secret and an event factor is the same as that by a user's secret and a time factor. Moreover, the password also can be gotten by computing a user's secret and a time & event factor. For example, this operation can be made by direct or indirect conversion of whole and part of a user's secret along with an operation to a time & event factor like addition, subtraction, multiplication, division, AND, OR, NOT, and XOR, etc.

The password can be further gotten by a combination of a fingerprint feature template with a time and/or an event factor. The process of generating a password by a fingerprint feature template and a time and/or event factor is the same as that by a user's secret and a time and/or an event factor.

In step 107, the password is output to a user.

The password can be shown on a screen and input by a user into a host to be authenticated. Also, the password can be output to a host by a USB communication interface in connection with the host. Further, the password can be output to a host by a blue-tooth or an infra-red communication interface.

Embodiment 2

Figure 2:
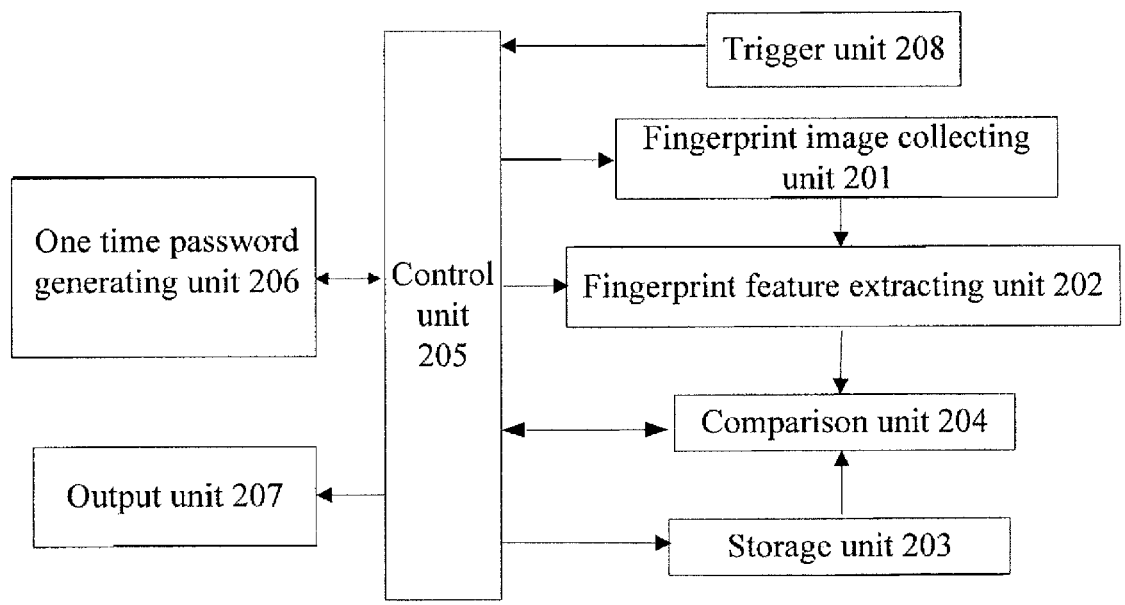
FIG. 2 is a structure view of an embodiment 2 of this invention.

In this embodiment 2, a one time password generating apparatus is disclosed. As shown in FIG. 2, a structure view of this embodiment 2, the apparatus includes a fingerprint image collecting unit 201, a fingerprint feature extracting unit 202, a storage unit 203, a comparison unit 204, a control unit 205, a one time password generating unit 206, and an output unit 207.

Fingerprint image collecting unit 201 is for collecting fingerprint images under control of the control unit 205, which can be an infra-red fingerprint sensor with a digital interface, a fingerprint scanner, a CCD, or a CMOS image sensor, etc.

Fingerprint feature extracting unit 202 is for extracting fingerprint feature data from fingerprint images under control of the control unit 205, which firstly converses those collected finger images into digital images convenient for extracting fingerprint feature by enhancing, segmenting, smoothing, and thinning them, and then extracts fingerprint feature data from those processed digital images.

Storage unit 203 is for pre-storing one or more fingerprint feature templates from one valid user, or a plurality of fingerprint feature templates from more valid users. The one time password generating algorithm can be pre-stored in the storage unit 203, or in the one time password generating unit 206. Also, the storage unit 206 can store the user's secret corresponding to one or more fingerprint feature templates used to generate a one time password in combination with a dynamic factor. Further, the storage unit 203 can be integrated with the control unit 205 into one control chip, or can be an extensive SRAM or FLASH memory in connection with the control unit 205.

Comparison unit 204 is for comparing fingerprint feature data extracted by the fingerprint feature extracting unit 202 with the fingerprint feature template pre-stored in the storage unit 203 when only one fingerprint feature template corresponding to one valid user is pre-stored in the storage unit 203, or with more templates one by one when more fingerprint feature templates corresponding to one or more valid users are pre-stored in the storage unit 203, and returning a comparison result to the control unit 205.

Control unit 205 is for enabling or disabling the one time password generating unit to generate a password based on the above comparison result. If the comparison result shows a match is found between the fingerprint feature and at least one of the fingerprint feature templates, an authentication is passed and one time password generating unit 206 is enabled, otherwise the user is authenticated as an invalid user and one time password generating unit 204 is disabled.

One time password generating unit 206 is for generating a password with pre-stored one time password generating algorithm under control of the control unit 205.

Output unit 207 is for outputting the password generated by the one time password generating unit 206; the output unit 207 can apply a USB communication interface, through which a working power will be supplied by a host. Also, the output unit 207 can be a screen, including a segment code screen, a dot-matrix screen, a characters screen or an images screen, or a blue-tooth or an infra-red communication interface through which a one time password is sent to a host and the apparatus is supplied power with a battery unit.

Furthermore, the one time password generating apparatus includes a trigger unit 208 for sending a trigger signal to the control unit 205 for enabling the fingerprint image collecting unit to collect fingerprint images, which can be a button, a digital key, or a sensor, etc.

Furthermore, the one time password generating apparatus includes an input unit for inputting fingerprint feature templates, which can be a USB interface, or a UART interface, etc.

Because a person's fingerprints are safe, unique, stable, easy to get and hard to copy, fingerprint identification becomes a method of identifying a user. With development of science and technology, fingerprint identification technology is perfecting.

In early 90's of twenty century, the fingerprint identification technology is widely used as a relatively perfect biometric identification method.

Due to cost cut by a large margin in the automatic fingerprint identification system, application of the above-mentioned technology is no longer limited to such sectors as law and public security. And it develops into a method of a user being authenticated by a computer.

Traditional fingerprint identification systems are all based on PC, which boast of quick identification speed, high storage volume, and perfect software design.

However, the PC-based fingerprint identification system has setbacks of high price, uneasy to move and high power loss, which limits its expansion in application.

Since late twenty century, the rapid development in silicon technology and embedded technology provides a platform for people to design a low-cost portable fingerprint identification system.

As a result, the fingerprint identification system is applied to many sectors, such as information security technology in visiting a website resource, authentication for an ATM card and a credit card, double-authentication for various smart IC cards, employee confirmation, and electronic lock for home usage.

The invention adds a fingerprint authentication function to the process of generating a one time password, this in detail means that, only the user who passes a valid authentication will get a true password. The improvement avoids setbacks that the old one time password generating apparatus is lack of a function of authenticating a user as the valid holder for the apparatus, and thus improves security of the apparatus. Meanwhile, the invention can be applied to authenticating more valid users through their fingerprints, that differs from that traditionally only used by one valid user, and therefore widens application of the apparatus. Furthermore, the invention avoids the risk that the apparatus may be imitated when lost or theft, as a result, improves security of the apparatus.

The above-mentioned is a detail description of the one time password generating method and apparatus thereof of this invention with explanations on its principle and embodiments, which is only for understanding the method and relative principle of the invention. Those skilled in the art will recognize that many modifications may be made to this configuration without departing from the scope of the present invention. Therefore, the method described in this specification should not be regarded as a limitation to the invention.

What is claimed is:

1. A one time password generating method comprising the steps of:
   collecting fingerprint images;
   extracting fingerprint feature data;
   comparing said fingerprint feature data with a pre-stored fingerprint feature template, said pre-stored fingerprint feature template being a valid user's fingerprint feature template; and
   generating a one time password after a match being found.

2. The one time password generating method according to claim 1, wherein before said step of collecting fingerprint images, the method further including a step of triggering a signal to collect said fingerprint images.

3. The one time password generating method according to claim 1, wherein said comparison being a step of comparing said fingerprint feature extracted with at least one of said fingerprint feature templates pre-stored separately.

4. The one time password generating method according to claim 1, wherein said one time password being generated by said fingerprint feature template or a user's secret corresponding to said template.

5. The one time password generating method according to claim 4, wherein said one time password being generated by computing said user's secret and a dynamic factor, or by computing said fingerprint feature template's value and a dynamic factor with preset password generating algorithm.

6. The one time password generating method according to claim 5, wherein said dynamic factor includes an event and/or a time factor.

7. The one time password generating method according to claim 1 further including a step of evening or merging fingerprint images collected from a plurality of times after said fingerprint images are collected.

8. The one time password generating method according to claim 1, further including a step of selecting an optimal fingerprint image collected from a plurality of times after said fingerprint images are collected.

9. The one time password generating method according to claim 1, wherein said valid user's fingerprint feature template including more than one fingerprint feature template.

10. The one time password generating method according to claim 1, wherein said pre-stored fingerprint feature templates are those from many valid users' fingerprint feature templates.

11. A one time password generating apparatus comprising:
   a fingerprint image collecting unit for collecting fingerprint images under control of a control unit;
   a fingerprint feature extracting unit for extracting fingerprint feature data from said fingerprint images collected by said fingerprint image collecting unit under control of said control unit;
   a storage unit for storing a fingerprint feature template under control of said control unit, said fingerprint feature template being a valid user's fingerprint feature template;
   a comparison unit for comparing said fingerprint feature data collected by said fingerprint feature extracting unit with those fingerprint feature templates in said storage unit, and returning a comparison result to said control unit;
   said control unit being for starting a one time password generating unit according to said comparison result and sending a one time password to an output unit;
   said one time password generating unit being for generating said one time password with a pre-stored one time password generating algorithm under control of said control unit and sending it to said control unit; and
   said output unit being for outputting said one time password under control of said control unit.

12. The one time password generating apparatus of claim 11, further including a trigger unit for sending a signal to said control unit to trigger said fingerprint image collecting unit.

13. The one time password generating apparatus of claim 11, wherein said output unit includes a screen, a blue-tooth communication interface, or an infrared communication interface.

14. The one time password generating apparatus of claim 13, further including a battery unit for power supply.

15. The one time password generating apparatus of claim 11, wherein said output unit being a USB communication interface.

16. The one time password generating apparatus of claim 15, wherein said USB communication interface being used as a power supply for the apparatus.

17. The one time password generating apparatus of claim 11, wherein said fingerprint image collecting unit including an infrared fingerprint sensor, a fingerprint scanner, a CCD, or a CMOS image sensor.

18. The one time password generating apparatus of claim 11, wherein said storage unit stores more than one fingerprint feature templates corresponding to one valid user.

19. The one time password generating apparatus of claim 11, wherein said storage unit stores a plurality of said fingerprint feature templates corresponding to more valid users.

20. The one time password generating apparatus of claim 11, further including an input unit for inputting one or more fingerprint feature templates into the apparatus.

* * * * *